US011243746B2

(12) United States Patent
Evangelopoulos et al.

(10) Patent No.: US 11,243,746 B2
(45) Date of Patent: Feb. 8, 2022

(54) LEARNING AND USING PROGRAMMING STYLES

(71) Applicant: X Development LLC, Mountain View, CA (US)

(72) Inventors: Georgios Evangelopoulos, Venice, CA (US); Olivia Hatalsky, San Jose, CA (US); Bin Ni, Fremont, CA (US); Qianyu Zhang, Sunnyvale, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 15 days.

(21) Appl. No.: 16/458,713

(22) Filed: Jul. 1, 2019

(65) Prior Publication Data
US 2021/0004210 A1   Jan. 7, 2021

(51) Int. Cl.
*G06F 9/44* (2018.01)
*G06F 8/33* (2018.01)
*G06N 3/08* (2006.01)
*G06F 8/40* (2018.01)

(52) U.S. Cl.
CPC ............ *G06F 8/33* (2013.01); *G06F 8/40* (2013.01); *G06N 3/08* (2013.01)

(58) Field of Classification Search
CPC ............... G06F 8/33; G06F 8/40; G06N 3/08
See application file for complete search history.

(56) References Cited

U.S. PATENT DOCUMENTS

| | | | | |
|---|---|---|---|---|
| 7,243,335 | B1 * | 7/2007 | Andrew | G06F 8/38 |
| | | | | 715/207 |
| 7,624,385 | B2 * | 11/2009 | Waddington | G06F 8/51 |
| | | | | 717/141 |
| 9,336,483 | B1 * | 5/2016 | Abeysooriya | G06N 3/08 |
| 10,382,799 | B1 * | 8/2019 | Walters | G06K 9/6253 |
| 10,565,093 | B1 * | 2/2020 | Herrin | G06F 11/3664 |
| 10,782,941 | B1 * | 9/2020 | Yoshida | G06F 11/36 |
| 2002/0056088 | A1 * | 5/2002 | Silva, Jr. | H04N 21/6582 |
| | | | | 725/9 |

(Continued)

OTHER PUBLICATIONS

Markovtsev et al. "Style-Analyzer: fixing code style inconsistencies with interpretable unsupervised algorithms". IEEE/ACM 16th International Conference on Mining Software Repositories (MSR). (Year: 2019).*

(Continued)

*Primary Examiner* — Adam Lee
(74) *Attorney, Agent, or Firm* — Middleton Reutlinger

(57) ABSTRACT

Techniques are described herein for using artificial intelligence to "learn," statistically, a target programming style that is imposed in and/or evidenced by a code base. Once the target programming style is learned, it can be used for various purposes. In various implementations, one or more generative adversarial networks ("GANs"), each including a generator machine learning model and a discriminator machine learning model, may be trained to facilitate learning and application of target programming style(s). In some implementations, the discriminator(s) and/or generator(s) may operate on graphical input, and may take the form of graph neural networks ("GNNs"), graph attention neural networks ("GANNs"), graph convolutional networks ("GCNs"), etc., although this is not required.

11 Claims, 7 Drawing Sheets

(56) References Cited

U.S. PATENT DOCUMENTS

| | | | | |
|---|---|---|---|---|
| 2002/0104071 | A1* | 8/2002 | Charisius | G06F 8/33 |
| | | | | 717/109 |
| 2003/0056195 | A1* | 3/2003 | Hunt | G06F 8/315 |
| | | | | 717/116 |
| 2003/0217023 | A1* | 11/2003 | Cui | G06N 5/02 |
| | | | | 706/45 |
| 2003/0233408 | A1* | 12/2003 | Goodman | G06Q 10/107 |
| | | | | 709/206 |
| 2004/0128657 | A1* | 7/2004 | Ghiya | G06F 8/437 |
| | | | | 717/141 |
| 2010/0083211 | A1* | 4/2010 | Poole | G06F 8/75 |
| | | | | 717/101 |
| 2010/0325528 | A1* | 12/2010 | Ramos, Sr. | G06F 40/103 |
| | | | | 715/230 |
| 2012/0110560 | A1* | 5/2012 | Fisher | G06F 8/437 |
| | | | | 717/146 |
| 2013/0290223 | A1* | 10/2013 | Chapelle | G06N 20/00 |
| | | | | 706/12 |
| 2014/0173563 | A1* | 6/2014 | Dias | G06F 8/36 |
| | | | | 717/123 |
| 2014/0201245 | A1* | 7/2014 | Boden | G06F 8/10 |
| | | | | 707/803 |
| 2015/0067653 | A1* | 3/2015 | Guarnieri | G06F 8/30 |
| | | | | 717/126 |
| 2015/0135166 | A1* | 5/2015 | Tarlow | G06F 8/75 |
| | | | | 717/125 |
| 2016/0217406 | A1* | 7/2016 | Najmi | G06Q 10/06315 |
| 2017/0123963 | A1* | 5/2017 | Koren | G06F 11/3668 |
| 2017/0124593 | A1* | 5/2017 | Nickerson | G06Q 30/0263 |
| 2018/0025270 | A1* | 1/2018 | John | G06N 3/0472 |
| | | | | 706/25 |
| 2018/0107478 | A1* | 4/2018 | Codato | G06F 8/71 |
| 2019/0236139 | A1* | 8/2019 | DeFelice | G06F 40/56 |
| 2019/0244699 | A1* | 8/2019 | Loebig | G06N 20/20 |
| 2019/0303140 | A1* | 10/2019 | Kelly | G06Q 10/063112 |
| 2019/0317739 | A1* | 10/2019 | Turek | G06N 3/0445 |
| 2019/0325309 | A1* | 10/2019 | Flamant | G06F 16/9024 |
| 2019/0392624 | A1* | 12/2019 | Elgammal | G06T 11/001 |
| 2020/0097554 | A1* | 3/2020 | Rezagholizadeh | G06N 3/0454 |
| 2020/0104102 | A1* | 4/2020 | Brockschmidt | G06F 8/34 |
| 2020/0104631 | A1* | 4/2020 | Zhang | G06K 9/6215 |
| 2020/0110864 | A1* | 4/2020 | Casado | G06N 3/006 |
| 2020/0126232 | A1* | 4/2020 | Guo | G06Q 10/04 |
| 2020/0134446 | A1* | 4/2020 | Soni | G06N 3/08 |
| 2020/0175102 | A1* | 6/2020 | Sobran | G06F 8/42 |
| 2020/0311195 | A1* | 10/2020 | Mishra | G06F 40/151 |
| 2020/0311913 | A1* | 10/2020 | Soni | G06N 3/08 |
| 2020/0311986 | A1* | 10/2020 | Tong | B60R 11/04 |

OTHER PUBLICATIONS

Allamanis, M. et al. "Learning Natural Coding Conventions." arXiv:1402.4182v3 [cs.SE] Apr. 7, 2014; 13 pages.

Chen, Z. et al. "A Literature Study of Embeddings on Source Code." arXiv preprint arXiv:1904.03061; Apr. 5, 2019; 8 pages.

Higo, Y. et al. "Generating Simpler AST Edit Scripts By Considering Copy-And-Paste." Proceedings of the 32Nd IEEE/ACM International Conference on Automated Software Engineering. IEEE Press, 2017; pp. 532-542.

Hindle, A. et al. "On the Naturalness of Software." Unpublished version of ICSE 2012 paper, with expanded future work section; 12 pages.

Wolf, Sara "CycleGAN: Learning to Translate Images (Without Paired Training Data)". https://towardsdatascience.com/cyclegan-learning-to-translate-images-without-paired-training-data-5b4e93862c8d [retrieved Jun. 6, 2019]; Nov. 19, 2018; 9 pages.

Xu, K. et al. "How Powerful Are Graph Neural Networks?." Published as a conference paper at ICLR 2019; 17 pages.

Yan, X. et al. "A Graph Convolutional Neural Network For Classification Of Building Patterns Using Spatial Vector Data." ISPRS Journal of Photogrammetry and Remote Sensing 150 (2019): pp. 259-273.

Zhu, J. et al. "Unpaired Image-to-Image Translation Using Cycle-Consistent Adversarial Networks." arXiv:1703.10593v6 [cs.CV] Nov. 15, 2018; 18 pages.

* cited by examiner

SOURCE CODE STYLE CONFORMANCE SUMMARY

| | |
|---|---|
| RECONCILE_DEBIT_ACCOUNTS.CC: | STYLE A |
| RECONCILE_CREDIT_ACCOUNTS.CC: | STYLE A |
| DISPLAY_AR_GRAPHICAL.JAVA: | NOT STYLE A |
| CUSTOMER_TUTORIAL.C: | NOT STYLE A |
| MERGE_ENTITY_FIELDS.PL: | NOT STYLE A |
| ACQUISITION_ROUNDUP.PHP: | STYLE A |
| ERROR_DECISION_TREE.PL | NOT STYLE A |

Fig. 4A  ~450

SOURCE CODE STYLE EDIT SUGGESTIONS

- [✓] CHANGE "CUST_A_AR" TO "custAAR"
- [✓] CHANGE "RECONCILE_COMMERCIAL_AR" TO "reconcileCommercialAR"
- [✓] CHANGE "//THIS IS TO CONVERT GROSS TO NET" TO "//INPUT: GROSS; OUTPUT: NET"

ACCEPT CHANGE(S)

Fig. 4B  ~460

LEARNING AND USING PROGRAMMING STYLES

BACKGROUND

Writing source code, or "programming," involves both form (e.g. syntax, semantics) and programming style. The former captures functionality, the latter good practices, experience or personal preferences (e.g. in design choices). An organization that develops software may wish to impose a particular programming style on source code developed by its employees. This particular programming style may be dictated by standards and/or best practices published by the organization. If those standards and/or best practices are followed during development of source code for the organization, the particular programming style may consequently be captured statistically in the developed source code. Particular programming styles are not limited to organization-imposed programming styles. For example, a particularly influential programmer may have a programming style that others wish to imitate. That programmer's programming style may also be captured statistically in source code written by, or at least under the supervision of, the influential programmer.

SUMMARY

Techniques are described herein for using artificial intelligence to "learn," statistically, a target programming style that is imposed in and/or evidenced by a code base. Once the target programming style is learned, it can be used for various purposes. These may include, but are not limited to, educating new programmers about how to conform with the target style, transforming source code programmed using another style to the target style, aligning styles used in disparate code based used by an organization, and/or providing software development tools that allow programmers to apply programming style changes to code they have written. In some implementations, techniques described herein may allow a software developer to transform a piece (or "snippet") of source code written by someone else to their own style, so that the software developer can more easily digest and/or understand the functionality of the source code.

Various types of machine learning models may be employed to learn programming styles and/or to apply learned programming styles. In some implementations, one or more generative adversarial networks ("GANs") may be trained to (a) facilitate transformation of source code from one programming style to a target programming style, and/or (b) to determine whether the source code conforms to the target programming style.

For example, a generator machine learning model may be trained to operate on input data indicative of a source code snippet, such as the source code itself, an abstract syntax tree ("AST") generated from the source code snippet, bytecode generated from the source code snippet, binary or object code compiled using the source code snippet, etc. The generator machine learning model may generate "edit output" based on this input. The edit output may be indicative of one or more edits to be made to the first code snippet. For example, the edit output may take the form of a latent space embedding that semantically captures the edit(s), an AST that includes the edit(s), an "edit script" that identifies the edit(s) that would transform the first source code snippet from another programming style to the target programming style, etc. In some implementations in which the edit output takes the form of a latent space embedding, an AST or edit script may be generated based on the latent space embedding, e.g., using a trained decoder machine learning model.

A discriminator machine learning model may be trained to operate on similar input data as the generator machine learning model, i.e., a source code snippet, an AST, bytecode, binary code, object code, etc. Based on this input, the discriminator may generate style output that indicates whether the input conforms to the target programming style the discriminator machine learning model is trained to detect. In some implementations, the input for the discriminator machine learning model may be the edit output of the generator machine learning model, or at least may be generated based on the edit output of the generator machine learning model. In some implementations, the discriminator machine learning model may be a binary classifier that classifies input as either not conforming to the target programming style (e.g., "zero") or conforming to the programming style (e.g., "one"). In other implementations, the discriminator machine learning model may generate output indicative of a probability, e.g., in the range from zero to one, that the input source code snippet conforms to the target programming style. In some cases, this probability may be used as a "grade" that indicates how well the input source code snippet conforms to the target programming style, e.g., 0.6 indicates the source code snippet is closer to conforming to the target programming style than, say, 0.4.

Various types of machine learning models may be deployed as the aforementioned generator and discriminator machine learning models, such as various flavors of neural networks, sequence-to-sequence models such as recurrent neural networks—including, for instance, long short-term ("LSTM") memory networks and/or gated recurrent units ("GRU")—and so forth. In some implementations, one or both the discriminator machine learning model and the generator machine learning model may be deployed as a neural network configured to operate on graph input, such as a graph neural network ("GNN"), a graph convolutional network ("GCN"), a graph attention neural network ("GANN," not to be confused with generative adversarial network, or "GAN"), and so forth. In examples described herein the GNN will be used for illustrative purposes, but that is not meant to be limiting, and it should be understood that these other graph-based machine learning models may be employed in addition or in the alternative.

Some graph-based machine learning models nominally generate output in the form of a latent space embedding. For example, a GNN generates output that includes latent space embedding(s) of individual nodes of the input graph and/or a collective latent space embedding that, for instance, combines all the nodes' individual latent space embeddings. Accordingly, when a GNN is used for the discriminator model, the GNN may be coupled with one or more "prediction" layers that are trained to generate probabilities and/or classifications based on the latent space embedding(s) generated by the GNN. These prediction layers may take various forms, such as softmax layers, sigmoid functions, etc.

In some implementations, transformations between two programming styles may be jointly learned. However, it may be unlikely that the code bases underlying each programming style can be aligned perfectly, or even approximately, into pairs for training. For example, an equivalent for a particular function from one code base may not necessarily be found in the other code base. Accordingly, in some implementations, techniques such as CycleGAN may be employed to facilitate relatively (or entirely) unsupervised learning of generator/discriminator pairs for each programming style. With such techniques it is possible to learn domain transformations between the two programming styles without requiring paired training data.

Once the discriminator and generator models are trained, they may be used for various purposes mentioned previously. For example, a trained generator may be applied to an input source code snippet written with a first programming style to generate edit output that indicates, for instance, one or more edits to be made to the input source code snippet to transform it to a target programming style. For example, the edit output may be an AST that conforms to the target programming style, an edit script that explicitly states the edit(s), and so forth. In some cases, additional downstream logic may transform the edit output into actual source code that conforms to the target programming style.

A discriminator machine learning model may be used to, for instance, notify a programmer whether their code conforms with a target programming style, or to notify the programmer how well their code conforms with the target programming style (e.g., as a grade). In either case, in some implementations, this notification may be accompanied by suggested edits, e.g., generated using the generator machine learning model applied to the programmer's source code, that notify the programmer what they can do to better conform with the target programming style. In many implementations, this functionality may be implemented as part of a software development application.

In some implementations, a method implemented using one or more processors may include: applying data associated with a first source code snippet as input across a generator machine learning model to generate edit output, wherein the edit output is indicative of one or more edits to be made to the first code snippet to conform with a target programming style; applying data indicative of the edit output as input across a discriminator machine learning model to generate style output, wherein the discriminator machine learning model is trained to detect conformance with the target programming style, and the style output indicates that the edit output fails to conform with the target programming style; and based on the style output, training the generator machine learning model.

In various implementations, the data associated with the first source code snippet comprises an abstract syntax tree ("AST") generated from the first source code snippet. In various implementations, the generator machine learning model comprises a graph neural network ("GNN"). In various implementations, the edit output generated based on the GNN comprises a latent space embedding. In various implementations, the method may further include generating, based on the latent space embedding, an abstract syntax tree ("AST") based on the latent space embedding, wherein the AST corresponds to a transformation of the first source code snippet from another programming style to the target programming style. In various implementations, the method may further include generating, based on the latent space embedding, an edit script based on the latent space embedding, wherein the edit script identifies one or more edits of the first source code snippet that would transform the first source code snippet from another programming style to the target programming style.

In various implementations, the edit output comprises: an abstract syntax tree ("AST") corresponding to a transformation of the first source code snippet from another programming style to the target programming style; or an edit script identifying one or more edits of the first source code snippet that would transform the first source code snippet from another programming style to the target programming style.

In various implementations, the discriminator machine learning model comprises a graph neural network ("GNN") coupled with a prediction layer. In various implementations, the prediction layer comprises a softmax layer or a sigmoid function layer.

In another aspect, a method implemented using one or more processors may include: applying data associated with a first source code snippet as input across a generator machine learning model to generate edit output; based on the edit output, generating a synthetic second source code snippet; applying data indicative of the synthetic second source code snippet as input across a discriminator machine learning model to generate style output, wherein the discriminator machine learning model is trained to detect conformance with the target programming style, and the style output indicates that the synthetic second source code snippet conforms with the target programming style; and based on the style output, training the discriminator machine learning model.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4A and FIG. 4B depict example graphical user interfaces, in accordance with various implementations.

DETAILED DESCRIPTION

Figure 1:
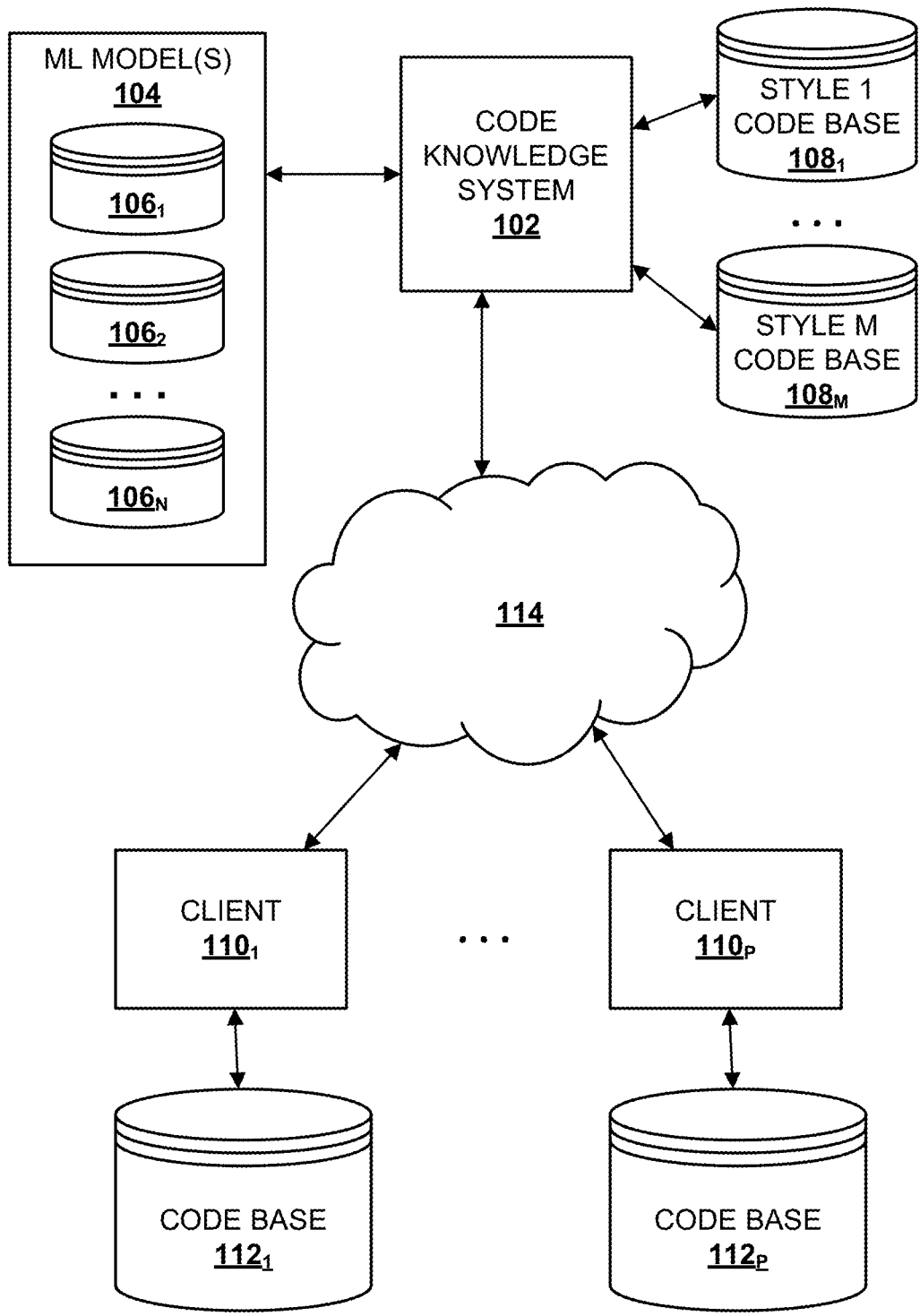
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

Code knowledge system 102 may be configured to perform selected aspects of the present disclosure in order to help one or more clients $110_{1-P}$ to manage one or more corresponding code bases $112_{1-P}$. Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancelations of flight, managing people associated with flights, such as passengers, air crews, and ground crews, managing airport gates, and so forth.

Code knowledge system 102 may be configured to leverage knowledge of multiple different programming styles in order to aid clients $110_{1-P}$ in imposing particular programming styles on their code bases $112_{1-P}$. For example, code knowledge system 102 may be configured to recommend specific changes to various snippets of source code as part of an effort to align the overall code base 112 with a particular programming style. In some implementations, code knowledge system 102 may even implement source code changes automatically, e.g., if there is sufficient confidence in a proposed source code change.

In various implementations, code knowledge system 102 may include a machine learning ("ML" in FIG. 1) database 104 that includes data indicative of one or more trained machine learning models $106_{1-N}$. These trained machine learning models $106_{1-N}$ may take various forms that will be described in more detail below, including but not limited to generative adversarial networks ("GANs"), a graph-based network such as a graph neural network ("GNN"), graph attention neural network ("GANN"), or graph convolutional neural network ("GCN"), a sequence-to-sequence model such as various flavors of a recurrent neural network (e.g., long short-term memory, or "LSTM", gate recurrent units, or "GRU", etc.) and/or an encoder-decoder, and any other type of machine learning model that may be applied to facilitate selected aspects of the present disclosure.

In some implementations, code knowledge system 102 may also have access to one or more programming-style-specific code bases $108_{1-M}$. In some implementations, these programming-style-specific code bases $108_{1-M}$ may be used, for instance, to train one or more of the machine learning models $106_{1-N}$. In some such implementations, and as will be described in further detail below, the programming-style-specific code bases $108_{1-M}$ may be used in combination with other data to train machine learning models $106_{1-N}$, such as other programming-style-specific code bases 108 to jointly learn transformations between programming styles.

In various implementations, a client 110 that wishes to enforce a programming style on all or part of its code base 112 may establish a relationship with an entity (not depicted in FIG. 1) that hosts code knowledge system 102. In some implementations, host knowledge system 102 may then obtain all or parts of the client's source code base 112, e.g., over one or more networks 114 such as the Internet, and return to the client 110 data indicative of recommended changes, or even updated source code that conforms with the desired programming style. In other implementations, e.g., where the client's code base 112 being brought into conformance with a programming style is massive, one or more representatives of the entity that hosts code knowledge system 102 may travel to the client's site(s) to perform transformations to the source code and/or make recommendations.

Figure 2:
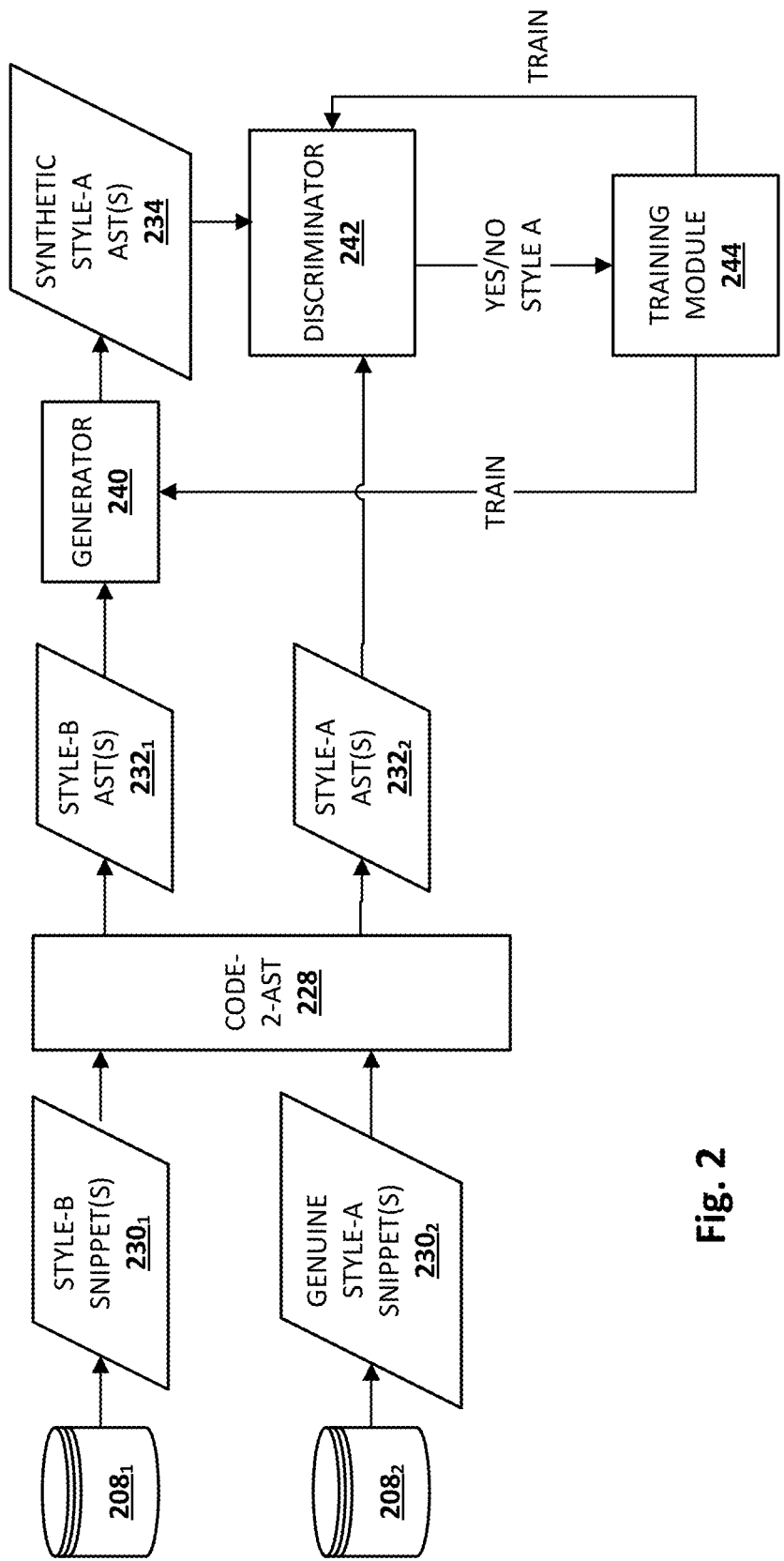
FIG. 2 is a block diagram showing an example of how components of a generative adversarial network may be trained, in accordance with various implementations.

FIG. 2 is a block diagram of an example process flow that may be implemented in whole or in part by code knowledge system 102 during training of machine learning models $106_{1-N}$. Various components depicted in FIG. 2 (e.g., 228, 240, 242, 244) may be implemented by code knowledge system 102 or separately from code knowledge system 102.

Beginning at the top left, a style-B code base $208_1$ may include one or more source code snippets $230_1$ written in a particular programming style ("B" in this example) that is different than a target programming style ("A" in this example). For example, each source code snippet $230_1$ may be obtained from a particular library, entity, and/or application programming interface ("API"). Each of style-B source code snippets $230_1$ may comprise a subset of a source code file or an entire source code file, depending on the circumstances. For example, a particularly large source code file may be broken up into smaller snippets (e.g., delineated into functions, objects, etc.), whereas a relatively short source code file may be kept intact throughout processing.

At least some of the style-B source code snippets $230_1$ of code base $208_1$ may be converted into alternative forms, such as a graph or tree form, in order for them to be subjected to additional processing. For example, in FIG. 2, a "code-2-AST" convertor 228, which may be implemented using any combination of hardware and machine-readable instructions, converts style-B source code snippets $230_1$ into style-B abstract syntax trees ("AST") $232_1$. An AST may represent constructs occurring in a given source code snippet, such as variables, objects, functions, etc., as well as the syntactic relationships between these components.

In addition to the top pipeline in FIG. 2 (i.e., components $208_1$, $230_1$, 228, $232_1$—hereby referred to as the "style-B pipeline"), in some implementations, another pipeline referred to as the "style-A" pipeline may process source code from another code base $208_2$ that is written in the targeted programming style A. For example, source code in style-A code base $208_2$ may be written in conformance with best practices and/or policies of a particular organization. Additionally or alternatively, source code in code base $208_2$ may be written by a particularly influential programmer whose style is meant to be mimicked. Similar to the style-B pipeline, in the style-A pipeline, "genuine" style-A source code snippets $232_2$ are obtained from style-A code base $208_2$ and processed by code-to-AST convertor 228 to generate style-A ASTs $232_2$.

The style-B ASTs $232_1$ and the style-A ASTs $232_2$ may then be used, one at a time and/or in batches, to train a generative adversarial network ("GAN") that includes a generator 240 and a discriminator 242. Generator 240 and/or discriminator 242 may take various forms, which may or may not be the same as each other. These forms may include, but are not limited to, a feed-forward neural network, a GNN, GANN, GCN, sequence-to-sequence model (e.g., an encoder-decoder), etc.

In some implementations, generator 240 is applied to style-B ASTs $232_1$ to generate what will be referred to herein as "edit output." Edit output is so named because it may indicate one or more edits to be made to the style-B source code snippet $230_1$ under consideration to conform with programming style A. Depending on the configuration of the machine learning model(s) used for generator 240, this edit output may take various forms. In some implementations, including that in FIG. 2, the edit output generated by generator 240 may take the form of a "synthetic" style-A AST 234 corresponding to a transformation of the style-B source code snippet $230_1$ from style B to the target programming style, style A in FIG. 2. This synthetic style-A AST 234 may be convertible into source code of style-A.

In other implementations, the edit output generated by generator 240 may take the form of an edit script identifying one or more edits of the style-B source code snippet $230_1$ that would transform style-B source code snippet $230_1$ from programming style B to style A. These edits may be implemented automatically or may be suggested for implementation to one or more programmers. In yet other implementations, the edit output may take the form of a latent space embedding, or feature vector. In some such implementations, the feature vector may then be applied as input across a decoder machine learning model (not depicted) that is trained to decode from latent space embeddings into style-A source code.

Meanwhile, and referring back to FIG. 2, genuine style-A source code snippet(s) $230_2$ may be converted, e.g., by code-2-AST convertor 228, to "genuine" style-A AST(s) $232_2$. The synthetic style-A AST(s) 234 and the genuine style-A AST(s) $232_2$ may be applied as training input(s) across discriminator 242 to generate what will be referred to herein as "style output." Style output may indicate whether the edit output generated by generator 242 conforms (yes/no) to programming style A, or a probability or confidence that the edit output conforms with programming style A.

During training, the style output generated by discriminator 242 may be provided to a training module 244, which may be implemented using any combination of hardware or software. Training module 244 may be configured to compare the style output to label(s) associated with the upstream input data. For example, during training, generator 240 or another component may label its edit output as "synthetic" or something similar. Meanwhile, style-A AST(s) $232_2$ may be labeled as "genuine" or something similar.

Training module 244 may compare these labels to style output generated by discriminator 242 for respective training examples. If the style output indicates that a particular training example (i.e., a particular synthetic style-A AST 234) conforms to programming style A but is actually associated with a label identifying the training example as "synthetic," then discriminator 242 has been "fooled." In response, training module 244 may train discriminator 242 as shown by the arrow in FIG. 2, e.g., using techniques such as gradient descent, back propagation, etc., so that discriminator 242 is better able to spot similar synthetic examples in the future.

By contrast, suppose the style output from discriminator 242 indicates that a particular training example (i.e., a particular synthetic style-A AST 234) labeled as "synthetic"—i.e., it was generated by generator 240—does not conform with programming style A. This means the attempt by generator 240 to "fool" discriminator 242 failed. In response, training module 244 may train generator 240 as shown by the arrow in FIG. 2, e.g., using techniques such as gradient descent, back propagation, etc., so that generator 240 is able to generate synthetic style-A AST(s) that are more likely to "fool" discriminator 242 moving forward.

After generator 240 and discriminator 242 are trained with a sufficient number of training examples, generator 240 may be adept at generating synthetic style-A AST(s) 234 that are virtually indistinguishable by discriminator 242 from "genuine" style-A AST(s) $232_2$. And discriminator 242 may be adept at spotting all but the best imitations of style-A AST(s). In some implementations, generator 240 may be usable moving forward to generate edit output that can be used to transform style-B source code snippets to style-A source code snippets. For example, the edit output may include an edit script with one or more proposed or candidate changes to be made to the style-B source code snippet, a style-A AST that can be converted to a style-A source code snippet, etc. Discriminator 242 may be usable moving forward to, for instance, notify a programmer whether their source code conforms to a target programming style.

As noted previously, in some implementations, generator 240 and/or discriminator 242 may be implemented using machine learning models that operate on graph input. With GNNs, for example, ASTs $232_{1-2}$ may be operated on as follows. Features (which may be manually selected or learned during training) may be extracted for each node of the AST to generate a feature vector for each node. Nodes of each AST may represent a variable, object, or other programming construct. Accordingly, features of the feature vectors generated for the nodes may include features such as variable type (e.g., int, float, string, pointer, etc.), name, operator(s) that act upon the variable as operands, etc. A feature vector for a node at any given point in time may be deemed that node's "state." Meanwhile, each edge of the AST may be assigned a machine learning model, e.g., a particular type of machine learning model or a particular machine learning model that is trained on particular data.

Then, for each time step of a series of time steps, feature vectors, or states, of each node may be propagated to their neighbor nodes along the edges/machine learning models, e.g., as projections into latent space. In some implementations, incoming node states to a given node at each time step may be summed (which is order-invariant), e.g., with each other and the current state of the given node. As more time steps elapse, a radius of neighbor nodes that impact a given node of the AST increases.

Intuitively, knowledge about neighbor nodes is incrementally "baked into" each node's state, with more knowledge about increasingly remote neighbors being accumulated in a given node's state as the machine learning model is iterated more and more. In some implementations, the "final" states for all the nodes of the AST may be reached after some desired number of iterations is performed. This number of iterations may be a hyper-parameter of the GNN. In some such implementations, these final states may be summed to yield an overall state or embedding of the AST.

When generator 240 is implemented using a GNN, the overall state or embedding of the AST may be applied as input across one or more additional machine learning models and/or other processing streams to generate a synthetic style-A AST 234 and/or style-A source code. For example, an encoder-decoder network, or "autoencoder," may be trained so that an encoder portion generates a latent space embedding from an input AST or source code, and a decoder portion translates that latent space embedding back into the original input. Once such an encoder-decoder network is trained, the decoder portion may be separated and applied to the latent space embedding generated by the GNN used for generator 240 to generate a style-A AST 234 and/or style-A source code. In some implementations in which discriminator 242 is implemented at least in part using a GNN, the GNN may be coupled with a prediction layer, e.g., a softmax layer or a sigmoid function layer, that outputs yes or no (or one or zero, or a probability) based on the latent space embedding generated by discriminator 242.

As noted previously, when jointly learning transformations between two programming styles, it may be unlikely that the code bases underlying each programming style can be aligned perfectly, or even approximately, into pairs for training. For example, a particular function in one code base may not necessarily have an equivalent in the other code base. Accordingly, in some implementations, techniques such as CycleGAN may be employed to facilitate relatively (or entirely) unsupervised learning of generator/discriminator pairs for each programming style. With such techniques it is possible to learn domain transformations between the two programming styles without requiring paired training data.

Figure 3:
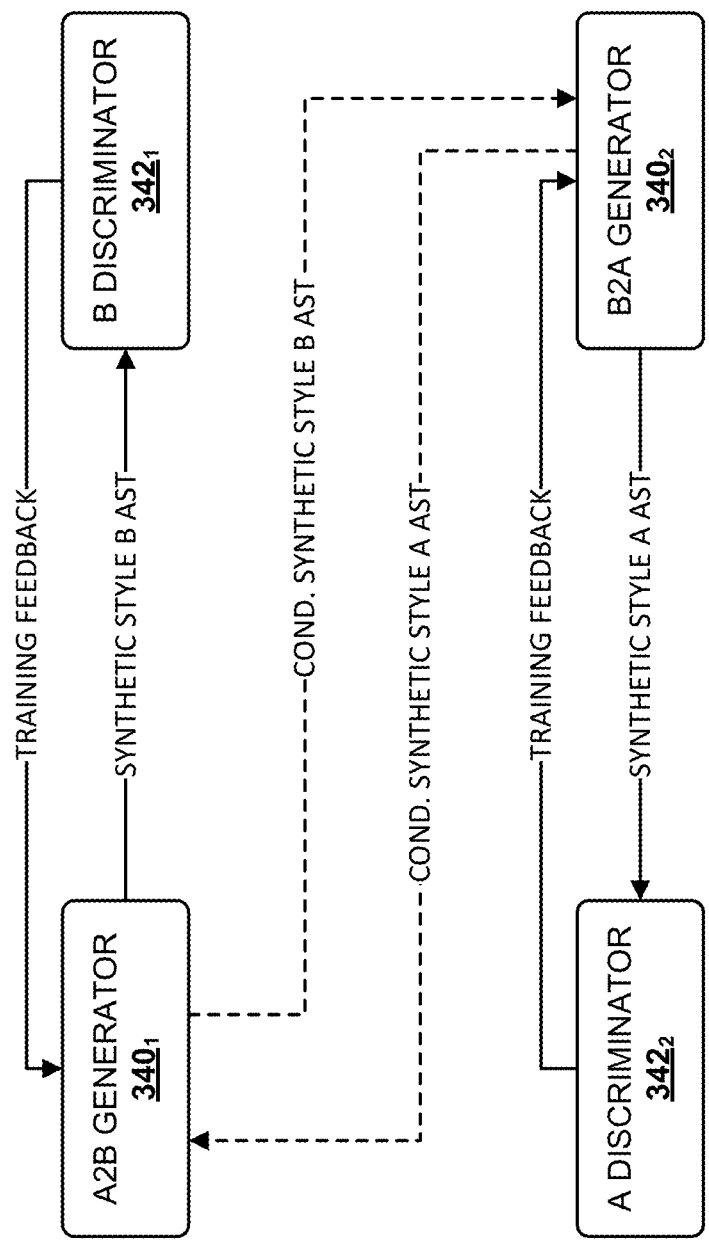
FIG. 3 schematically demonstrates one example of how a CycleGAN may be used to jointly learn transformations between two programming styles.

FIG. 3 schematically depicts an example of how CycleGAN techniques may be employed to jointly learn transformations between two programming styles, style A and style B. In FIG. 3, a first GAN at the top includes an A2B generator $340_1$ and a B-style discriminator $342_1$. A2B generator $340_1$ may be trained to operate on programming style-A input (e.g., source code snippet(s), AST(s), etc.) to generate edit output that is indicative of changes to be made to the style-A input to transform it to programming style B. Style-B discriminator $342_1$ may be trained to classify input (e.g., source code snippet(s), AST(s), etc.) as conforming or not conforming to programming style B.

A second GAN at bottom includes a B2A generator $340_2$ and a style-A discriminator $342_2$. B2A generator $340_2$ may be trained to operate on programming style-B input (e.g., source code snippet(s), AST(s), etc.) to generate edit output that is indicative of changes to be made to the style-B input to transform it to programming style A. Style-A discriminator $342_2$ may be trained to classify input (e.g., source code snippet(s), AST(s), etc.) as conforming or not conforming to programming style A.

Similar to FIG. 2 and as shown by the arrows in FIG. 3, A2B generator $340_1$ may generate synthetic style-B AST training examples that are then applied as input across style-B discriminator $342_1$, e.g., along with other training examples (not depicted) that include "genuine" style-B AST(s). Based on style-B discriminator $342_1$ correctly or incorrectly classifying input as conforming to programming style-B, style-B discriminator $342_1$ and/or A2B generator $340_1$ may be trained in a fashion similar to that depicted in FIG. 2. The same goes for B2A generator $340_2$ and style-A discriminator $342_2$.

In addition, as indicated by the dashed arrow from A2B generator $340_1$ to B2A generator $340_2$, synthetic style-B AST(s) generated by A2B generator $340_1$ may be conditionally applied as input across B2A generator $340_2$. This conditional application may turn on the style output of style-B discriminator $342_1$. If the style output of style-B discriminator $342_1$ indicates that the synthetic style-B AST conforms to programming style-B (i.e., style-B discriminator $342_1$ has been "fooled"), then the synthetic style-B AST may be applied as input across B2A generator $340_2$ to generate a synthetic style-A AST, which may then be applied as input across style-A discriminator $342_2$.

Similarly, as indicated by the dashed arrow from B2A generator $340_2$ to A2B generator $340_1$, synthetic style-A AST(s) generated by B2A generator $340_2$ may be conditionally applied as input across A2B generator $340_1$. This conditional application may turn on the style output of style-A discriminator $342_2$. If the style output of style-A discriminator $342_2$ indicates that the synthetic style-A AST conforms to programming style-A (i.e., style-A discriminator $342_2$ has been "fooled"), then the synthetic style-A AST may be applied as input across A2B generator $340_1$ to generate a synthetic style-B AST, which may then be applied as input across style-B discriminator $342_1$. Thus, a training cycle is formed that enables joint learning of transformations between programming styles A and B without having paired data.

Techniques described herein may be utilized to provide programmers, e.g., operating client devices $110_{1-P}$, with tools that facilitate conformance with target programming styles. These tools may be provided, for instance, as features or plugins associated with a software development tool. These tools may enable programmers to see whether their source code conforms to a target programming style (e.g., one color of text may indicate conforming code whereas another color of text may indicate non-conforming code), to receive suggestions as to how their source code can be modified to conform to the target programming style (e.g., for training purposes), and/or to automatically transform their source to the target programming style.

FIG. 4A depicts an example graphical user interface ("GUI") 450 that conveys whether a plurality of source code snippets conform or do not conform to a particular programming style. This information may be generated based on decisions made by output generated by discriminators such as 242 and $342_{1-2}$. In this example, each snippet corresponds to a programming source code file, but this is not required, and each snippet may correspond to a portion of a programming source code file, such as a particular function, object class, etc. As also indicated in this example, the source code snippets need not necessarily all be written in the same programming language. Indeed, programming styles may transcend programming languages in many cases.

In this example, some snippets, such as RECONCILE_DEBIT_ACCOUNTS.CC, RECONCILE_CREDIT_ACCOUNTS.CC, and ACQUISITION_ROUNDUP.PHP conform to programming style A. The remaining source code snippets do not. In other examples, rather than simply indicating whether or not a source code snippet conforms to programming style-A, a probability or grade that indicates how well the source code snippet conforms to programming style-A may be provided. An interface such as 450 may allow a programmer to focus on those source code snippets that do not yet conform to the target programming style.

In some implementations, the programmer may be able to select a source code snippet from GUI 450 to receive more specific information about why the selected source code snippet doesn't conform to the target programming style. For example, in some implementations, by clicking a non-conforming source-code snippet, the programmer may be presented with a list of potential edits that can be made to the source code snippet to bring it into conformance with the target programming style.

FIG. 4B depicts one example of a GUI 460 that presents a programmer with edit suggestions that may be implemented to bring one or more source code snippets into conformance with a target programming style. These edit suggestions may be determined, for instance, based on an edit script generated by a generator (e.g., 240, $340_{1-2}$) as part of its edit output. In this example, each proposed or "candidate" edit is accompanied by a check box that can be toggled between checked and not checked. If the programming clicks the "ACCEPT CHANGE(S)" button, those changes that are checked may be implemented automatically. Those changes that are not checked may not be implemented.

Figure 5:
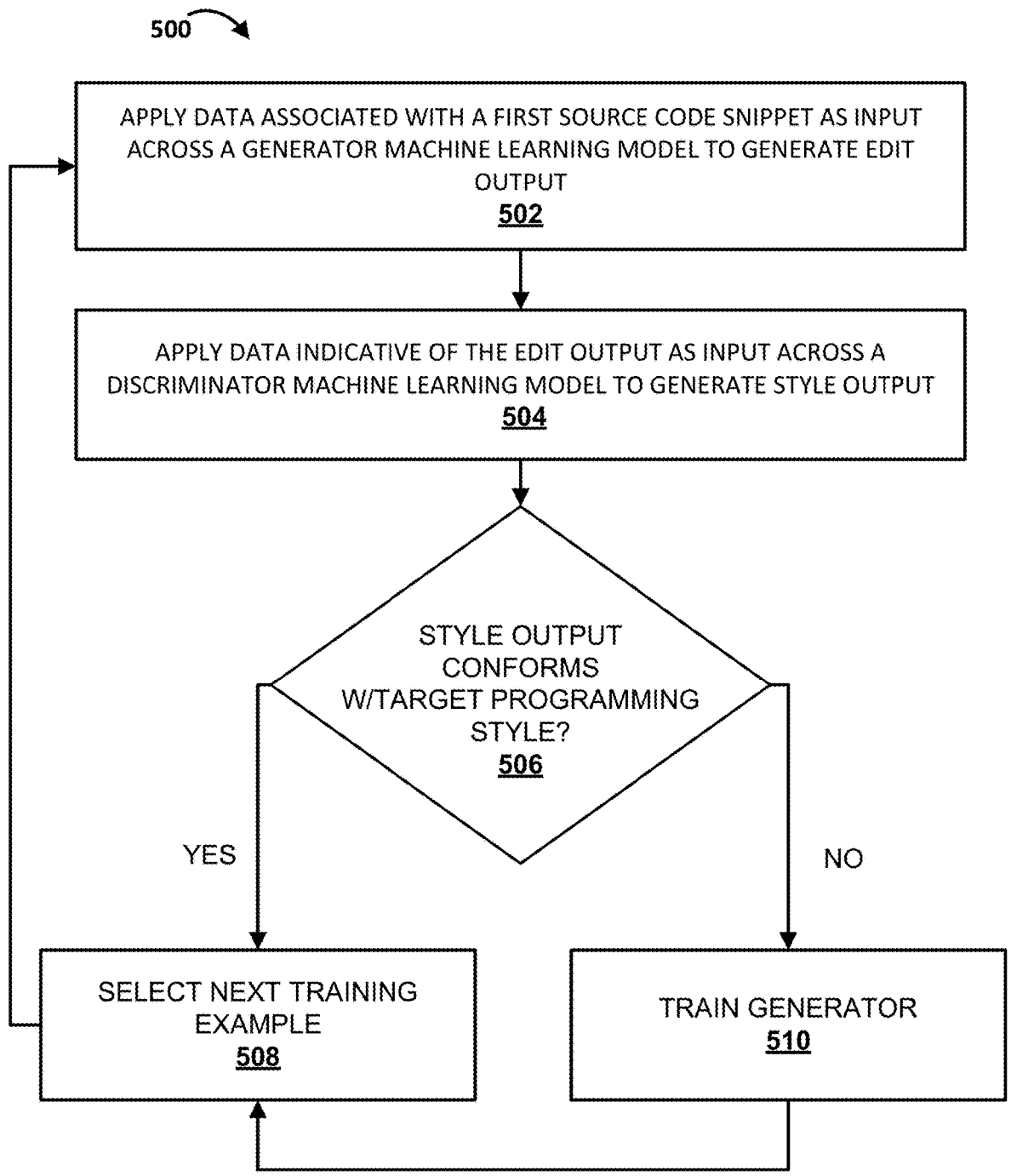
FIG. 5 depicts a flowchart illustrating an example method for training a generator according to implementations disclosed herein.

FIG. 5 is a flowchart illustrating an example method 500 of training a generator machine learning model such as 240, $340_{1-2}$ in accordance with implementations disclosed herein. For convenience, the operations of the flow chart are described with reference to a system that performs the operations. This system may include various components of various computer systems, such as one or more components of code knowledge system 102. Moreover, while operations of method 500 are shown in a particular order, this is not meant to be limiting. One or more operations may be reordered, omitted or added.

At block 502, the system may apply data associated with a first source code snippet, such as the source code snippet itself, an AST generated from the source code snippet, or a latent space embedding generated from the snippet or from the AST (e.g., using a GNN), as input across a generator machine learning model to generate edit output. In various implementations, the edit output may be indicative of one or more edits to be made to the first code snippet to conform to a target programming style.

At block 504, the system may apply data indicative of the edit output as input across a discriminator machine learning model to generate style output. As noted previously, the discriminator machine learning model may be trained to detect conformance with the target programming style. At block 506, the system may determine whether the style output indicates that the edit output conforms to the target programming style.

If it is determined at block 506 that the edit output conforms to the target programming style, then method 500 may proceed to block 508, at which point the next training example is selected. However, if at block 506 the system determines that the style output indicates nonconformance of the edit output with the target programming style, then method 500 may proceed to block 510. At block 510, the system, e.g., by way of training module 244, may train the generator machine learning model, e.g., using techniques such as gradient descent, back propagation, etc.

Figure 6:
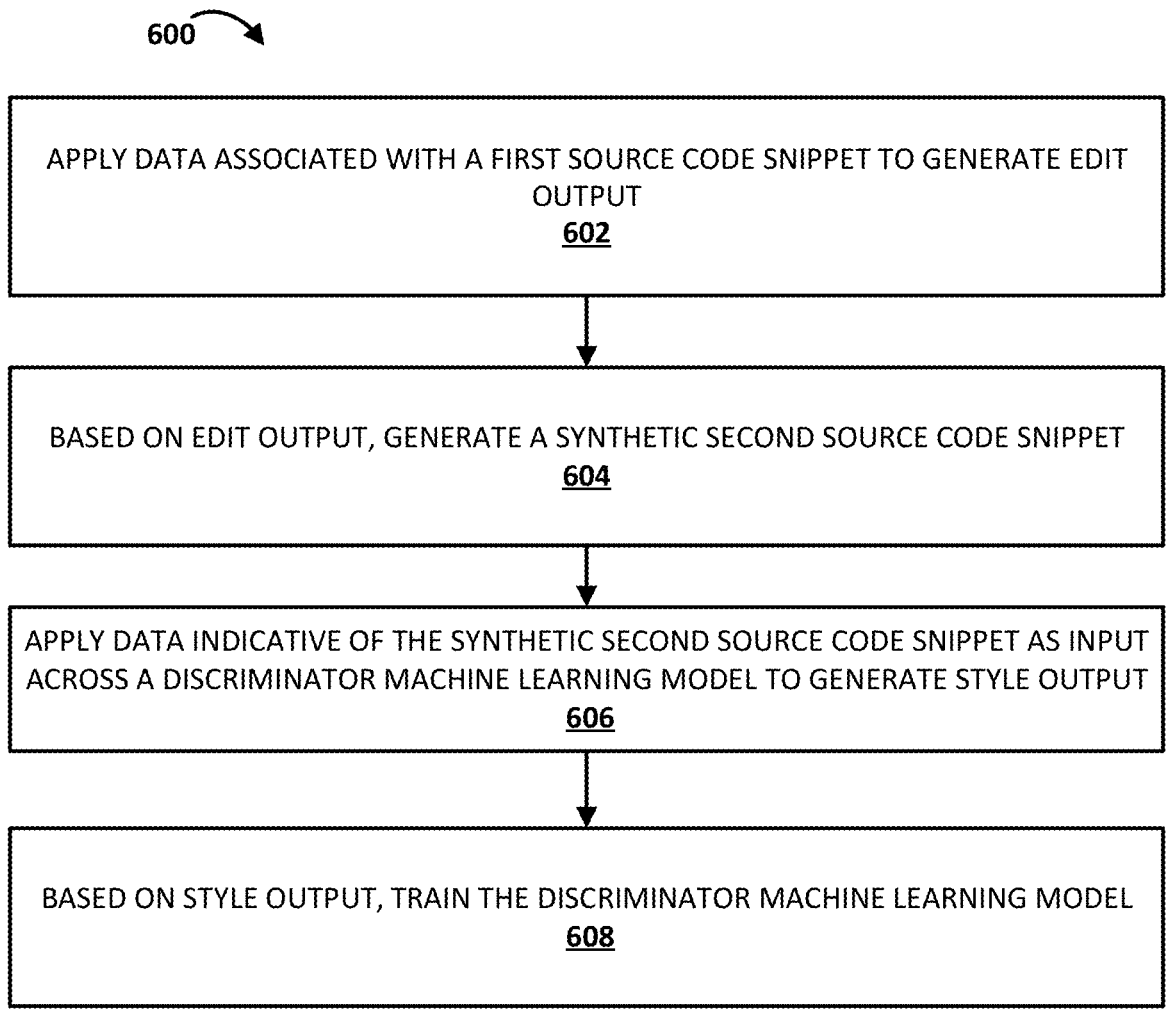
FIG. 6 depicts a flowchart illustrating an example method for training a discriminator according to implementations disclosed herein.

FIG. 6 is a flowchart illustrating an example method 600 of training a discriminator machine learning model such as 242, $342_{1-2}$ using techniques described herein, in accordance with implementations disclosed herein. For convenience, the operations of the flow chart are described with reference to a system that performs the operations. This system may include various components of various computer systems, such as one or more components of code knowledge system 102. Moreover, while operations of method 600 are shown in a particular order, this is not meant to be limiting. One or more operations may be reordered, omitted or added.

At block 602, the system may apply data associated with a first source code snippet, such as the source code snippet itself, an AST generated from the source code snippet, or a latent space embedding generated from the snippet or from the AST (e.g., using a GNN), as input across a generator machine learning model (e.g., 240, $340_{1-2}$) to generate edit output. This edit output may take the form of an edit script, synthetic AST, a latent space embedding, etc.

Based on the edit output generated at block 602, at block 604, the system may generate a synthetic second source code snippet. For example, if the edit output generated at block 602 was an AST, generating the synthetic second source code snippet may be a simple matter of converting the AST to source code using known techniques. In other implementations in which the edit output comprises a latent space embedding, the latent space embedding may be applied across a trained decoder machine learning model to generate source code output.

At block 606, the system may apply data indicative of the synthetic second source code snippet as input across a discriminator machine learning model (e.g., 242, $342_{1-2}$) to generate style output. As described previously, the discriminator machine learning model may be trained to detect conformance with the target programming style. Thus, the style output may indicate that the synthetic second source code snippet conforms to, or does not conform to, the target programming style.

Based on the style output generated at block 606, at block 608, the system (e.g., by way of training module 244) may train the discriminator machine learning model, e.g., using techniques such as gradient descent, back propagation, etc. For example, if the discriminator classifies the synthetic second source code snippet as genuine, that may serve as a negative training example for the discriminator. By contrast, if the discriminator correctly classifies the synthetic second source code snippet as synthetic, that may serve as a positive training example.

Figure 7:
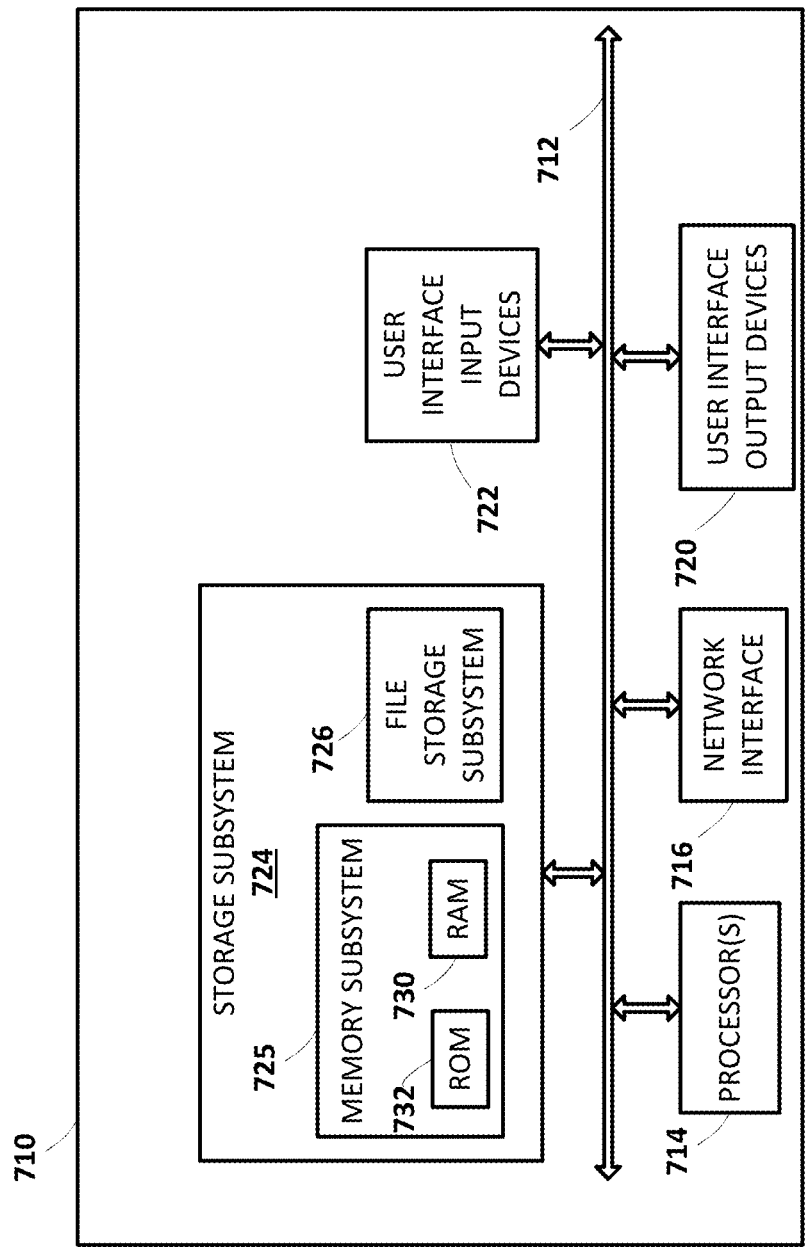
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIGS. 5-6, as well as to implement various components depicted in FIGS. 1-2.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    processing an abstract syntax tree (AST) that represents a first source code snippet based on a generator machine learning model of a generative adversarial network (GAN) to generate a synthetic AST, wherein the synthetic AST corresponds to a transformation of the first source code snippet from another programming style to a target programming style via one or more candidate edits, and wherein the generator machine learning model comprises a first graph neural network (GNN);
    processing the synthetic AST based on a discriminator machine learning model of the GAN to generate style output, wherein the discriminator machine learning model comprises a second GNN trained based on training data that includes source code snippets in the target programming style, some of which are labeled as genuine and others that are labeled synthetic, and the style output indicates that, if the one or more candidate edits were applied to the first source code snippet, the edited first source code snippet would fail to conform with the target programming style; and
    based on the style output, training the generator machine learning model.

2. The method of claim 1, wherein the discriminator GNN is coupled with a prediction layer.

3. The method of claim 2, wherein the prediction layer comprises a softmax layer or a sigmoid function layer.

4. A method implemented using one or more processors, comprising:
    processing an abstract syntax tree (AST) that represents a first source code snippet based on a generator machine learning model of a generative adversarial network (GAN) to generate a synthetic AST, wherein the synthetic AST corresponds to a transformation of the first source code snippet from another programming style to a target programming style via one or more candidate edits, and wherein the generator machine learning model comprises a first graph neural network (GNN);
    processing the synthetic AST based on a discriminator machine learning model of the GAN to generate style output, wherein the discriminator machine learning model comprises a second GNN trained based on training data that includes source code snippets in the target programming style, some of which are labeled as genuine and others that are labeled synthetic, and the style output indicates that the synthetic second source code snippet conforms with the target programming style; and
    based on the style output, training the discriminator machine learning model.

5. The method of claim 4, wherein the discriminator GNN is coupled with a prediction layer.

6. The method of claim 5, wherein the prediction layer comprises a softmax layer or a sigmoid function layer.

7. A system comprising one or more processors and memory storing instructions that, in response to execution of the instructions by the one or more processors, cause the one or more processors to:
    process an abstract syntax tree (AST) that represents a first source code snippet based on a generator machine learning model of a generative adversarial network (GAN) to generate a synthetic AST, wherein the synthetic AST corresponds to a transformation of the first source code snippet from another programming style to a target programming style via one or more candidate edits, and wherein the generator machine learning model comprises a first graph neural network (GNN); and
    cause to be presented, at one or more output devices, output that includes the one or more candidate edits to be made to the first source code snippet;
    wherein the generator machine learning model is trained using the following operations:
    processing a training AST that represents a training source code snippet based on the generator machine learning model to generate a training synthetic AST, wherein the training synthetic AST corresponds to a transformation of the first source code snippet from another programming style to a target programming style via one or more candidate edits;

processing the training synthetic AST based on a discriminator machine learning model of the GAN to generate style output, wherein the discriminator machine learning model comprises a second GNN trained based on training data that includes source code snippets in the target programming style, some of which are labeled as genuine and others that are labeled synthetic, and the style output indicates whether, if the one or more candidate edits were applied to the training source code snippet, the edited training source code snippet would conform to the target programming style; and based on the style output, training the generator machine learning model.

8. The system of claim 7, wherein the discriminator machine learning model is trained using the following operations:

processing the synthetic training AST based on the discriminator machine learning model to generate the style output; and based on the style output, training the discriminator machine learning model.

9. The system of claim 7, further comprising instructions to generate a synthetic source code snippet based on the synthetic AST.

10. The system of claim 9, wherein the output comprises a graphical user interface that conveys whether the synthetic source code snippet conforms to the target programming style.

11. The system of claim 7, wherein the output comprises a graphical user interface that presents one or more edit suggestions corresponding to the one or more candidate edits to be made to the first source code snippet.

\* \* \* \* \*